(12) United States Patent
Knuppel et al.

(10) Patent No.: US 6,631,582 B2
(45) Date of Patent: Oct. 14, 2003

(54) LOW PROFILE TILT-RAMP TRAP

(75) Inventors: Harry E. Knuppel, Albia, IA (US); Kathy J. Wauson, Albia, IA (US)

(73) Assignee: Kness Mfg. Co., Inc., Albia, IA (US)

( * ) Notice: Subject to any disclaimer, the term of this patent is extended or adjusted under 35 U.S.C. 154(b) by 0 days.

(21) Appl. No.: 09/942,329

(22) Filed: Aug. 28, 2001

(65) Prior Publication Data

US 2003/0041504 A1 Mar. 6, 2003

(51) Int. Cl.[7] .............................................. A01M 23/04
(52) U.S. Cl. ................................................ 43/69; 43/64
(58) Field of Search ............................... 43/69, 70, 71, 43/72

(56) References Cited

U.S. PATENT DOCUMENTS

| | | | | | |
|---|---|---|---|---|---|
| 376,246 | A | * | 1/1888 | Kunderd ........................ | 43/69 |
| 1,501,378 | A | * | 7/1924 | Talisman ....................... | 43/69 |
| 1,728,701 | A | * | 9/1929 | Sholin .......................... | 43/69 |
| 1,828,486 | A | * | 10/1931 | Bryan ........................... | 43/69 |
| 1,948,601 | A | * | 2/1934 | Thomas ......................... | 43/69 |
| 3,423,870 | A | * | 1/1969 | Kost ............................. | 43/69 |
| 3,786,591 | A | | 1/1974 | Morford | |
| 4,048,745 | A | | 9/1977 | Morford | |
| 4,151,673 | A | * | 5/1979 | Campbell ....................... | 43/67 |
| 4,241,531 | A | * | 12/1980 | Nelson et al. ................ | 43/69 |
| 5,299,380 | A | * | 4/1994 | Fornal, Sr. .................... | 43/66 |

FOREIGN PATENT DOCUMENTS

DE          3436330 C1 * 1/1986 ..................... 43/60

* cited by examiner

Primary Examiner—Charles T. Jordan
Assistant Examiner—Tara M Golba
(74) Attorney, Agent, or Firm—McKee, Voorhees & Sease, P.L.C.

(57) ABSTRACT

A low profile tilt-ramp trap includes a tube providing entrance into the trap. Within the tube is a tilt ramp that has a flap on its exit end to prevent mice from moving beneath the tilt ramp. Once a mouse enters the tilt ramp, the ramp pivots to provide the mouse access to the interior of the trap. A counter weight causes the tilt ramp to move back to its initial position after the mouse has entered.

5 Claims, 4 Drawing Sheets

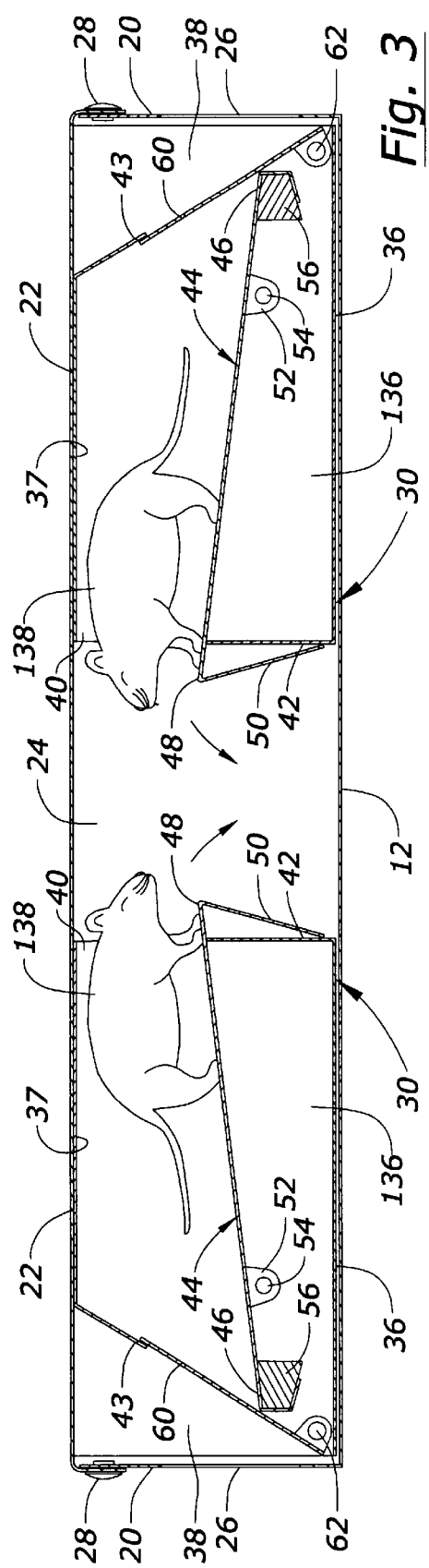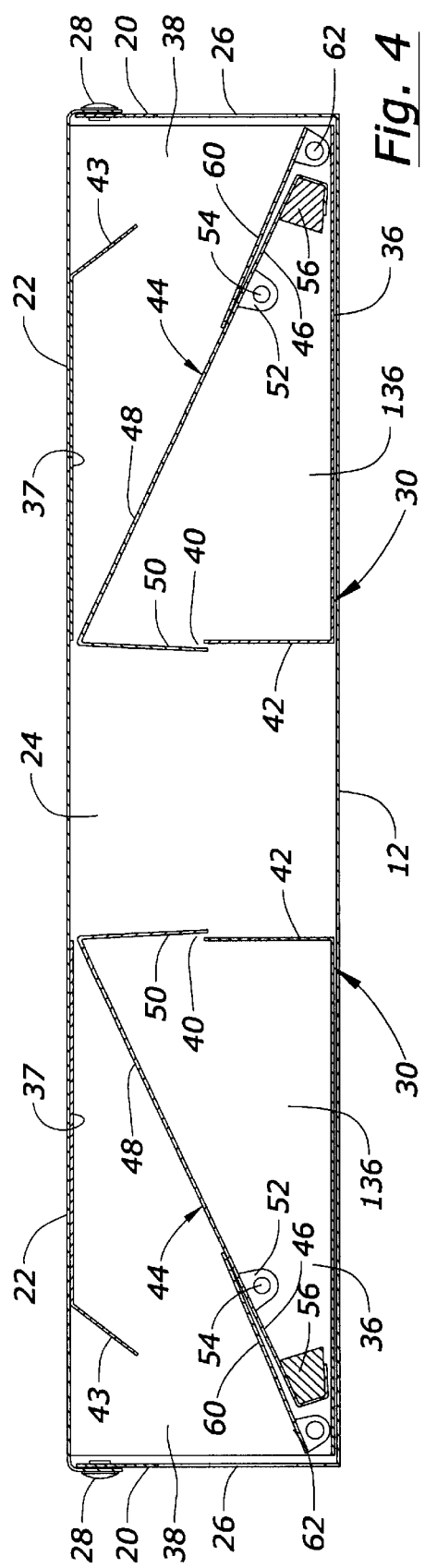

LOW PROFILE TILT-RAMP TRAP

BACKGROUND OF THE INVENTION

The present invention relates to a low profile tilt-ramp trap.

FIGS. 5 and 6 show a typical prior art low profile tilt-ramp trap. This trap is of the type manufactured under the trademark Tin Cat® by Wood Stream Corporation, Lititz, Pa. 17543. The prior art trap is designated generally by the numeral 100. It includes a box 102 which encloses a trap compartment 104. Providing entrance into the trap compartment 104 is a mouse hole 106.

Within the box 102 is a tube 108 having a tube entrance opening 110 adjacent the mouse hole 106 and having a tube exit opening 112 providing communication into the trap compartment 104.

Within the tube 108 is a two piece tilt ramp 114 comprising a first ramp 116 and a second ramp 120. First ramp 116 is pivoted about an axis or pin 118 and second ramp 120 is pivoted about a second pivot point or pin 122. Second ramp 120 includes a counter weight 124 which biases the second ramp to the position shown in FIG. 5. The first ramp 116 includes an entrance end 128 opposite from the exit end 130. The second ramp 120 includes an entrance end 132 and an exit end 134.

A mouse entering the trap enters through the mouse hole 106 and proceeds up the first ramp 116 while the ramp 116 is in its position shown in FIG. 5. As the mouse proceeds to the second ramp 120, the weight of the mouse causes the second ramp 120 to tilt to the position shown in FIG. 6. This articulates the first ramp 120 with the second ramp 116, and causes the exit end 130 of the first ramp 116 to swing upwardly and engage a downwardly extending flap 126 formed integrally with the tube 108.

A mouse 138 which is poised on the second ramp 120 causes the ramp to tilt downwardly and hold the first ramp 116 against the downwardly extending flap 126. This closes the tube to prevent any exit of the mouse 138 from the tube. The only outlet for the mouse 138 is through the tube exit opening 112.

One disadvantage of the prior art device shown in FIGS. 5 and 6 relates to the space 136 below the exit end 134 of second ramp 120. As several mice are accumulated in the trap compartment 104 it is possible that a mouse can enter into the space 136. Then when a new mouse proceeds through the mouse opening 106 to rest upon the second ramp 120, the mouse below prevents the second ramp 120 from moving downwardly. Thus the trap looses its ability to trap additional mice.

Therefore a primary object of the present invention is the provision of an improved low profile tilt-ramp trap.

Another object of the present invention is the provision of an improved trap which prevents mice already within the trap from moving beneath the tilt ramp to prevent other mice from entering the trap.

A further object of the present invention is the provision of an improved low profile tilt-ramp trap that has a transparent lid for viewing the contents of the trap.

A further object of the present invention is the provision of an improved low profile tilt-ramp trap which is economical to manufacture, durable in use, and efficient in operation.

BRIEF SUMMARY OF THE INVENTION

The foregoing objects may be achieved by a rodent trap comprising a box having a top wall, a bottom wall, end walls, a front wall and a rear wall enclosing a trap compartment. At least a first mouse opening is in one of the front, rear, or side walls of the box. An elongated tube is within the trap compartment. The tube has an open entrance end in communication with the first mouse opening and has an open exit end providing communication into the trap compartment. The tube has a vertical wall partially covering the exit opening of the tube for permitting a mouse to enter the trap compartment from the tube.

An elongated tilt ramp is within the tube and includes an entrance end adjacent the mouse opening of the box and an exit end adjacent the exit opening of the tube. A hinge pivotally mounts the tilt ramp within the tube for tilting movement about a hinge axis from a first position wherein the entrance end is adjacent the bottom wall of the box and the mouse opening and the exit end is elevated above the entrance end, to a second position wherein the exit end is lowered from the first position.

A flap is provided on the exit end of the tilt ramp. The flap is in covering relation over the exit opening of the tube when the tilt ramp is in its first position and is removed from covering relation over the exit opening of the tube when the tilt ramp is in its second position. A bias member is connected to the tilt ramp and biases the tilt ramp to its first position. The bias member will yield in response to the weight of a mouse adjacent the exit end of the tilt ramp to permit the tilt ramp to move to its second position. The bias member may be a weight, a spring, or any other device that raises the tilt ramp to its first position.

According to another feature of the invention, a panel partially blocks the exit opening of the entrance tube and prevents mice from moving below the exit end of the tilt ramp when the tilt ramp is in its first position.

According to another feature of the invention the flap on the exit end of tilt ramp cooperates with the panel to block the exit opening of the tube when the tilt ramp is in its first position.

According to another feature of the invention the box includes a top wall hinged to move from a closed position enclosing the trap compartment to an open position providing access to the trap compartment. The entrance tube and the tilt ramp are carried by the top wall during movement of the top wall between its open and closed positions. The top wall may be transparent to permit viewing of the contents of the trap.

BRIEF DESCRIPTION OF THE DRAWINGS

FIG. 3 is a sectional view taken along line 3–3 of FIG. 1.

FIG. 4 is a view similar to FIG. 3, but showing the tilt ramps in their lowered position.

DETAILED DESCRIPTION OF THE INVENTION

Figure 1:
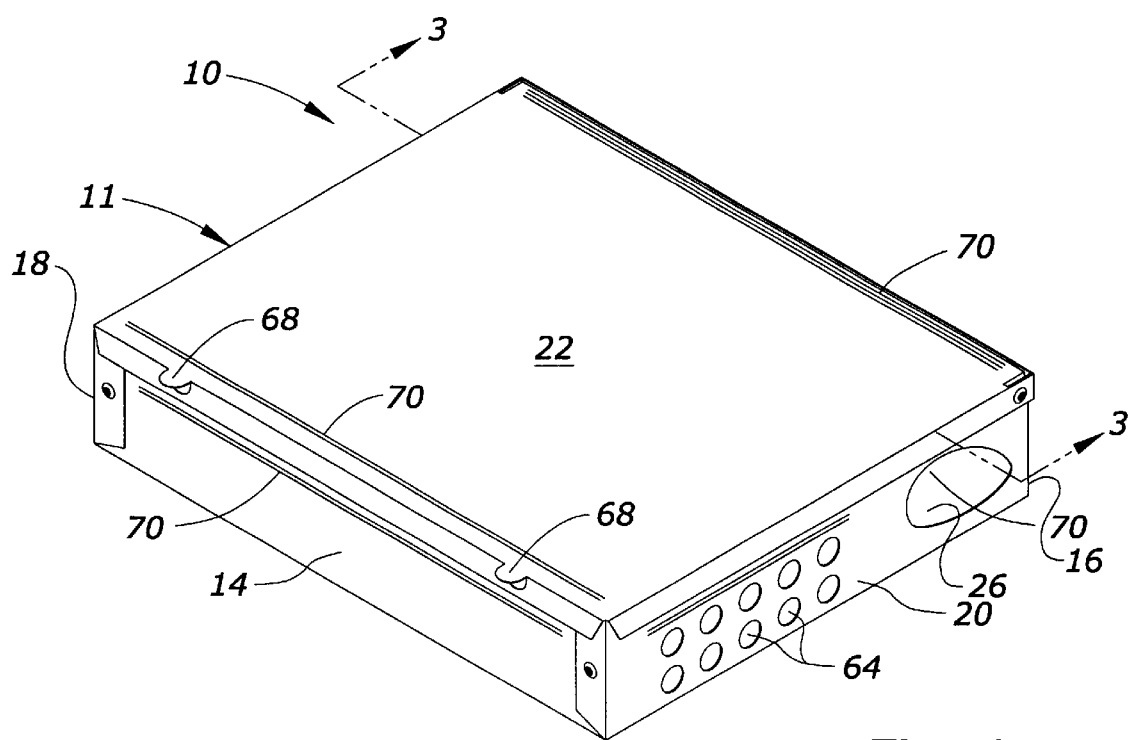
FIG. 1 is a perspective view of the low profile tilt-ramp trap of the present invention.

Referring now to the drawings the numeral 10 generally designates the low profile tilt-ramp trap of the present invention. Trap 10 is in the form of a box 11 having a bottom wall 12 (FIGS. 3 and 4), a front wall 14, a rear wall 16, an end wall 18, an opposite end wall 20, and a top wall 22 that is hinged for opening and closing. These walls form an enclosed trap compartment 24. Three ribs 70 are provided to add strength. Also a pair of lift tabs 68 facilitate opening of top wall 22. A mouse opening 26 is provided in one or more of the walls, 14, 16, 18, and 20. In the drawings there are two mouse openings 26 shown in the opposite end walls 18, 20. There are also a plurality of insect openings 64.

Figure 2:
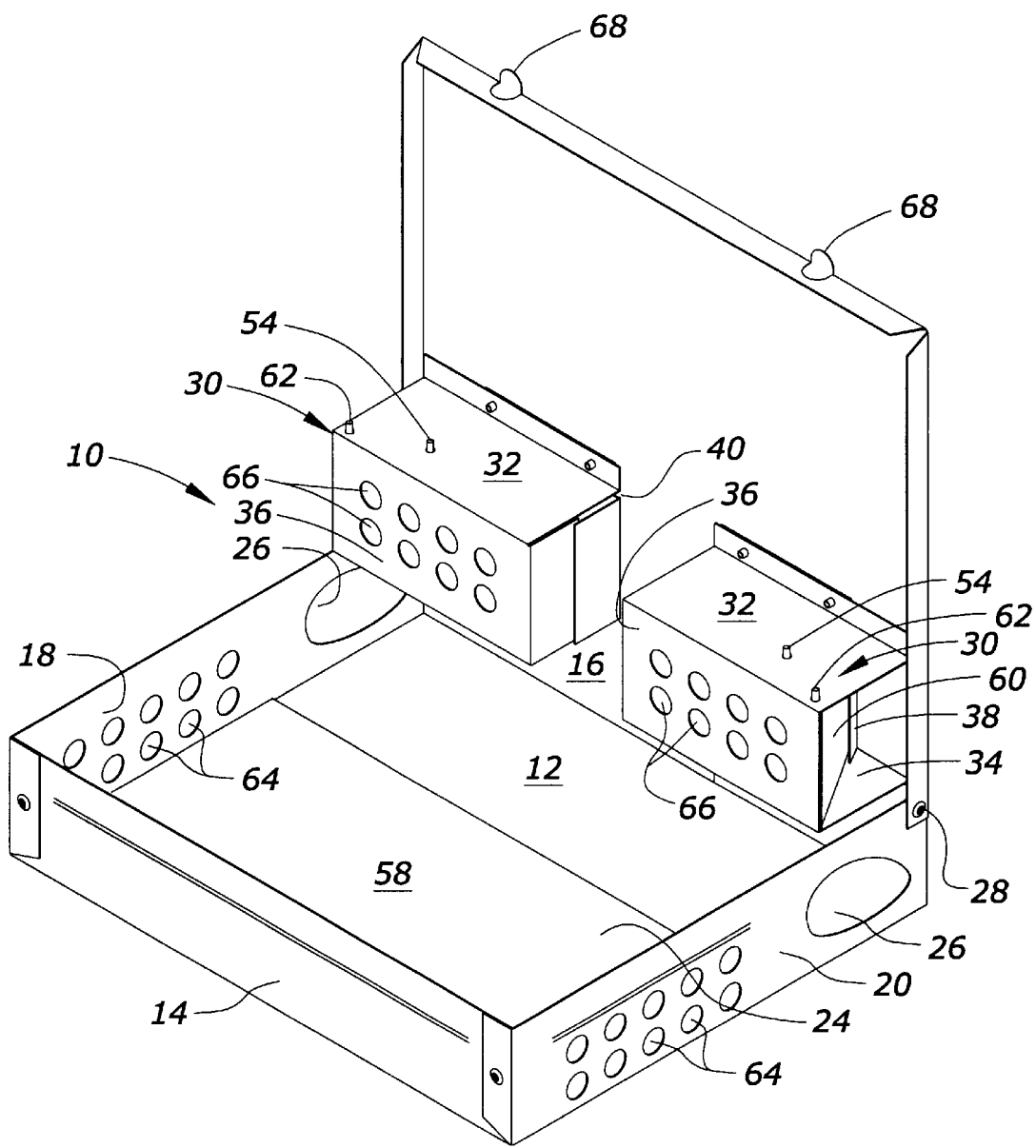
FIG. 2 is a perspective view of the trap of FIG. 1, showing the lid hinged to its open position.
Figure 5:
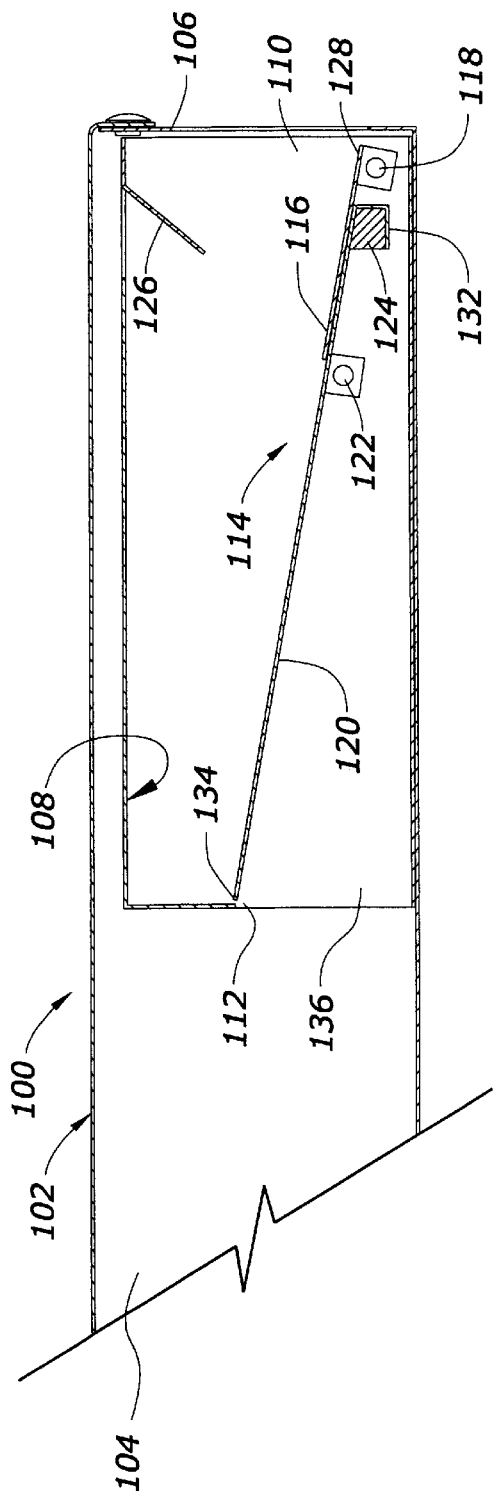
FIGS. 5 and 6 are views similar to view 3 and 4 respectively, showing prior art construction of prior art tilt-ramp traps.
Figure 6:
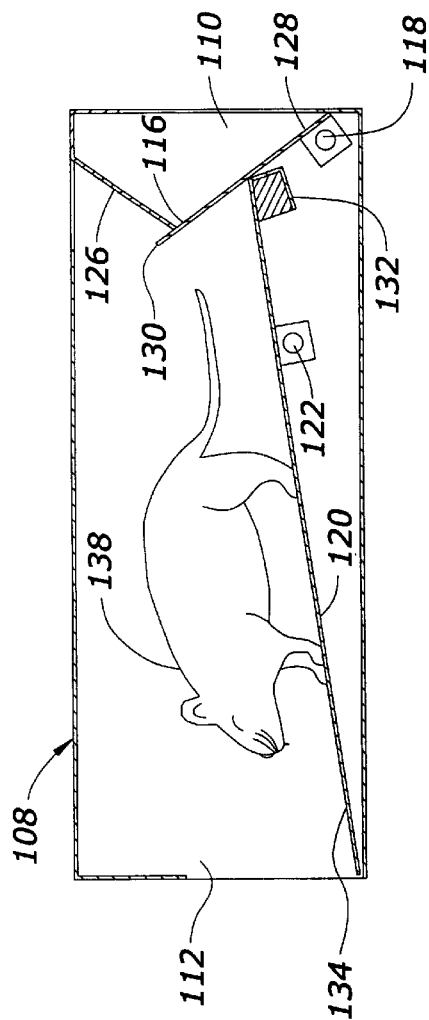

A pair of tubes 30 are mounted to the under side of the top wall 22 as can be seen in FIG. 2. When the top wall 22 is closed the tubes 30 are in registered alignment with the two mouse openings 26.

Each tube comprises a tube front wall 32, a tube back wall 34, and a tube floor 36 and a tube top wall 37 which are attached to the top wall 22 to form a square shaped tube having a tube entrance opening 38 and a tube exit opening 40. A tube end panel 42 extends upwardly at the tube exit opening, and forms a partial block of the tube exit opening 40. A tube closure flap 43 angles downwardly and forwardly from top wall 37 toward tube entrance opening 38. The bottom walls 36 of the two tube openings each are provided with a plurality of cleaning openings 66 for cleaning and letting in light.

Within each of the tubes 30 is a tilt ramp 44 having an entrance end 46 and an exit end 48. Exit end 48 is provided with a downwardly extending flap or flange 50. A pivot or hinge 52 is provided by a pivot pin 54 and enables the tilt ramp 44 to pivot about a horizontal axis. The entrance end 46 of tilt ramp 44 is provided with a counter weight or biasing member 56 which urges the tilt ramps 44 to the position shown in FIG. 4.

In this position the downwardly extending flaps or flanges 50 cooperate with the upwardly extending tube end panels 42 to completely block the tube exit opening 40. This will prevent any mice that are within the trap compartment 24 from entering the tubes 30. It also will prevent the mice from moving beneath the exit ends 48 of the tilt ramps 44. This overcomes the prior art problem where mice can move beneath the tilt ramp and prevent the tilt ramp from yielding to an additional mouse entering the trap. With the present invention the mice within compartment 24 cannot move beneath the tilt ramp 44 and therefore they do not prevent other mice from entering the trap.

The trap may be provided with a glue board 58 (FIG. 2) to which mice may become attached. A closure plate 60 is pivoted about closure pivot 62 for pivotal movement from an open position (FIG. 4) to a closed position (FIG. 3).

FIG. 4 illustrates the operation of the tilt ramps 44 before a mouse enters the trap. The mouse first enters the mouse opening 26 and proceeds up one of the ramps 44 which are in the position shown in FIG. 4. As the mouse 138 approaches the exit end 48 of the trap, the weight of the mouse causes the tilt ramp 44 to pivot to the position shown in FIG. 3. This pivotal movement causes the closure plate 60 to pivot upwardly to engage the closure flap 43 and prevent the mouse 138 from retreating or exiting from the tube entrance opening 38. In this position the downwardly extending flap or flange 50 slides over the upwardly extending panel 42 so as to open the exit opening 40 of the tube 30, and the mouse 138 may enter the trap compartment 24. As soon as the mouse steps down from the ramp 44, the counter weight 56 causes the ramp to move again to its initial position shown in FIG. 4. In this position the flap 50 and the panel 42 block the space 136 beneath the ramp 44 so as to prevent mice from moving beneath the ramp 44 and preventing blocking the entrance of other mice into the trap. The top wall 22 of box 11 is shown to be opaque, but it is also possible to make the top wall transparent so as to enable viewing of the contents of trap 10.

In the drawings and specification there has been set forth a preferred embodiment of the invention, and although specific terms are employed, these are used in a generic and descriptive sense only and not for purposes of limitation. Changes in the form and the proportion of parts as well as in the substitution of equivalents are contemplated as circumstances may suggest or render expedient without departing from the spirit or scope of the invention ass further defined in the following claims.

What is claimed is:

1. A rodent trap comprising:

a box having a top wall, a bottom wall, end walls, a front wall, and a rear wall enclosing a trap compartment;

at least a first mouse opening in one of said front, rear, and end walls of said box;

an elongated tube within said trap compartment, said tube having a first open end and having a second end;

said tube having a vertical wall partially covering said second end and leaving an exit opening in said second end of said tube for permitting a mouse to enter said trap compartment from said tube;

an elongated tilt ramp within said tube having an entrance end adjacent said mouse opening of said box and having an exit end adjacent said exit opening of said tube;

a hinge pivotally mounting said tilt ramp within said tube for tilting movement about a hinge axis from a first position wherein said entrance end is adjacent said bottom wall of said box and said mouse opening and said exit end is elevated above said entrance end, to a second position wherein said exit end is lowered from said first position;

said tube having a front tube wall, a back tube wall, and a tube floor all being attached to said top wall of said box;

said top wall of said box being hinged to said box for movement from an open position wherein said tube is outside said box to a closed position wherein said tube is within said box and said first open end thereof is in registered alignment with said first mouse opening.

2. A rodent trap according to claim 1 wherein said tube includes a tube end panel adjacent said second end of said tube, said tube end panel and said tilt ramp cooperating to prevent mice within said trap compartment from moving below said exit end of said tilt ramp when said tilt ramp is in said first position.

3. A rodent trap comprising:

a box forming an enclosed trap compartment within said box;

a mouse opening in said box;

an entrance tube within said box, said entrance tube having a floor, and opposite side tube walls and having an entrance opening in communication with said mouse opening and an exit opening providing communication from said tube into said trap compartment;

a tilt ramp within said entrance tube and having an entrance end and an exit end;

a hinge pivotally mounting said tilt ramp for pivotal movement about a hinge axis from a first position wherein said exit end is elevated to a second position wherein said exit end is lowered from said first position;

said entrance end of said tilt ramp having a weight greater than the weight of the exit end of said tilt ramp so as to bias said tilt ramp to said first position when there is no mouse on said tilt ramp and so as to yield to the weight of a mouse adjacent said exit end of said tilt ramp to move said tilt ramp to said second position;

said box having a top wall hinged to move from a closed position enclosing said trap compartment to an open position providing access to said trap compartment;

said side walls and said floor of said entrance tube and said tilt ramp being carried by said top wall during movement of said top wall between said open position wherein said entrance tube is outside said trap compartment to said closed position wherein said entrance tube is within said trap compartment and said entrance opening thereof is registered with said mouse opening.

4. A rodent trap according to claim 3 wherein said top wall of said box is transparent to permit viewing of said trap compartment from outside said box.

5. A rodent trap comprising:

a box having a top wall, a bottom wall, end walls, a front wall, and a rear wall enclosing a trap compartment;

at least a first mouse opening in one of said front, rear, and end walls of said box;

an elongated tube within said trap compartment having a tube floor and a tube top wall, said tube having a first open end in communication with said first mouse opening and having a second end;

said tube having an upstanding end wall extending upwardly from said tube floor and partially covering said second end, the upstanding wall having an upper edge exposing an exit opening thereabove in said second end of said tube for permitting a mouse to exit said tube and enter said trap compartment;

an elongated tilt ramp within said tube having an entrance end adjacent said mouse opening of said box and having an exit end adjacent said exit opening of said tube;

a hinge pivotally mounting said tilt ramp within said tube for tilting movement about a hinge axis from a first position wherein said entrance end is adjacent said bottom wall of said box adjacent said mouse opening and said exit end engages said tube top wall, to a second position wherein said exit end is lowered from said first position and is above said upper edge of said upstanding wall;

a flap extending downwardly from said exit end of said tilt ramp and terminating in a lower flap edge, said flap being in covering relation over said exit opening of said tube when said tilt ramp is in said first position and being removed from covering relation over said exit opening of said tube when said tilt ramp is in said second position;

said entrance end of said tilt ramp having a weight greater than the weight of the exit end of said tilt ramp so as to bias the tilt ramp to said first position when there is no mouse on the tilt ramp and so as to yield to the weight of a mouse adjacent said exit end of said tilt ramp to move said tilt ramp to said second position;

said tube being attached to said top wall of said box;

said top wall of said box being hinged to said box for movement from an open or position wherein said tube is outside said box to a closed position wherein said tube is within said box and said first open end thereof is in registered alignment with said first mouse opening.

* * * * *